March 29, 1966  W. F. MONA  3,242,779
RECIPROCAL MULTIPLE SAW FOR CELLULAR RESINOUS BODIES
Filed Nov. 27, 1964  5 Sheets-Sheet 1
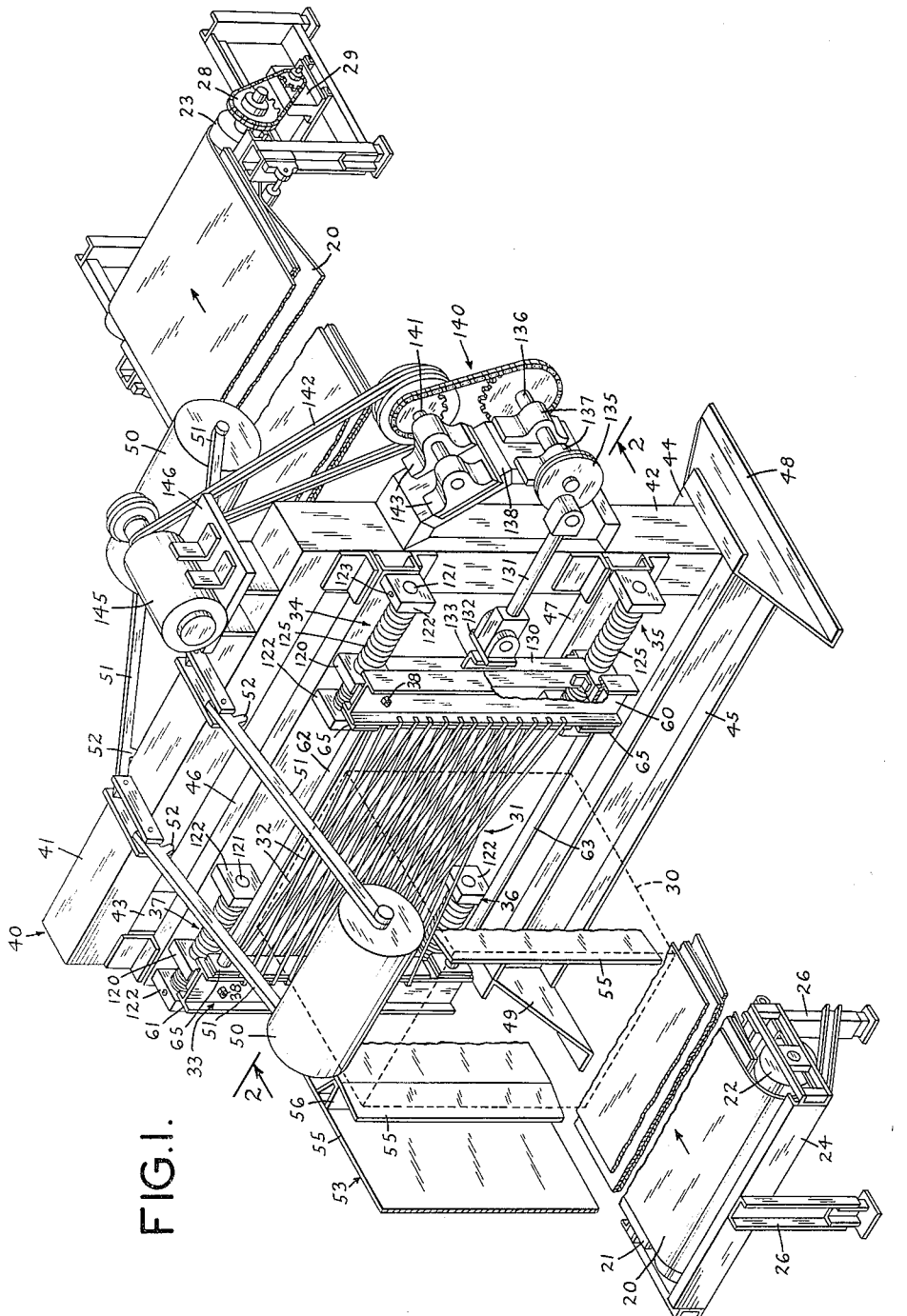
FIG.I.
INVENTOR
WILLIAM F. MONA
BY
Richard E. Vila
ATTORNEY

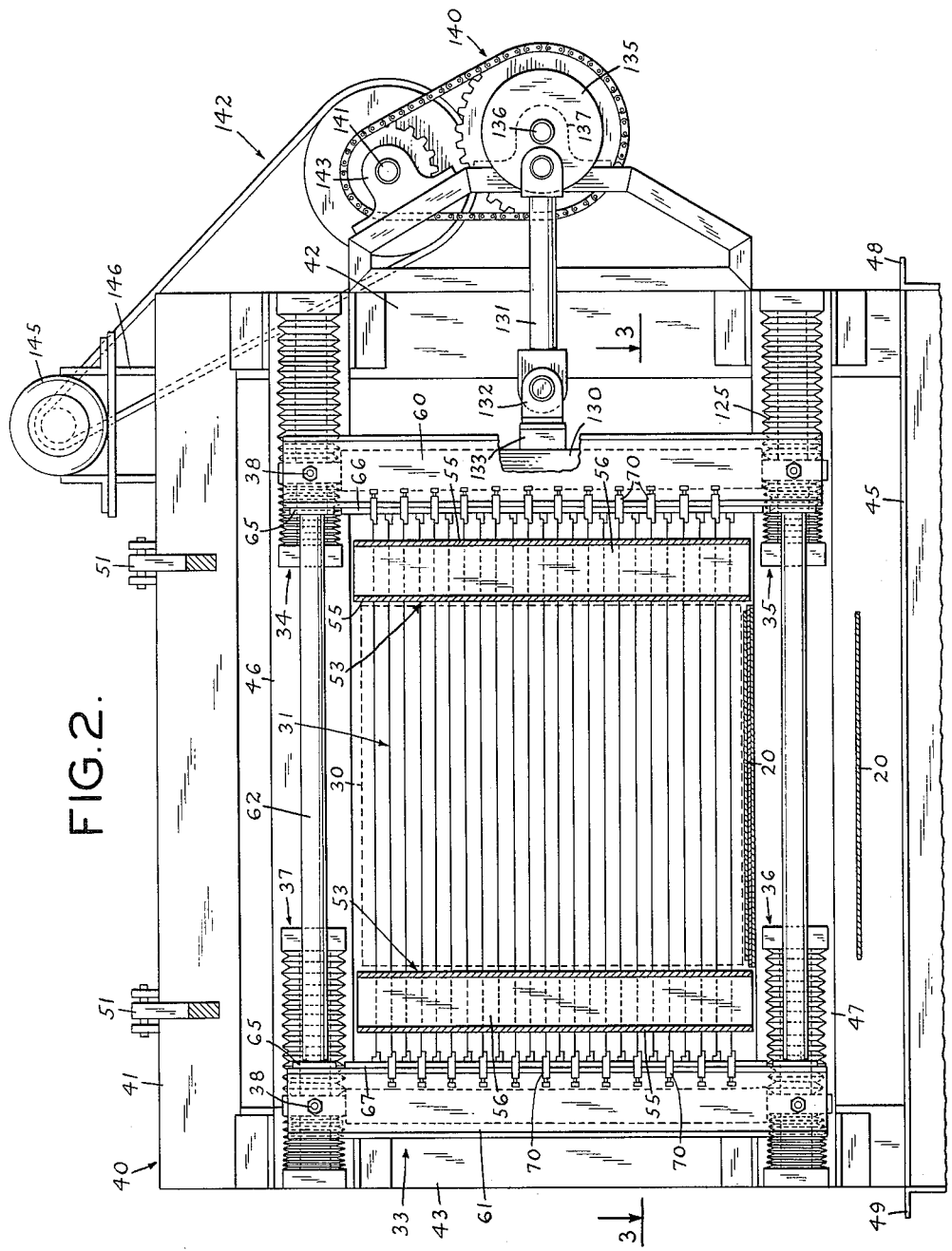

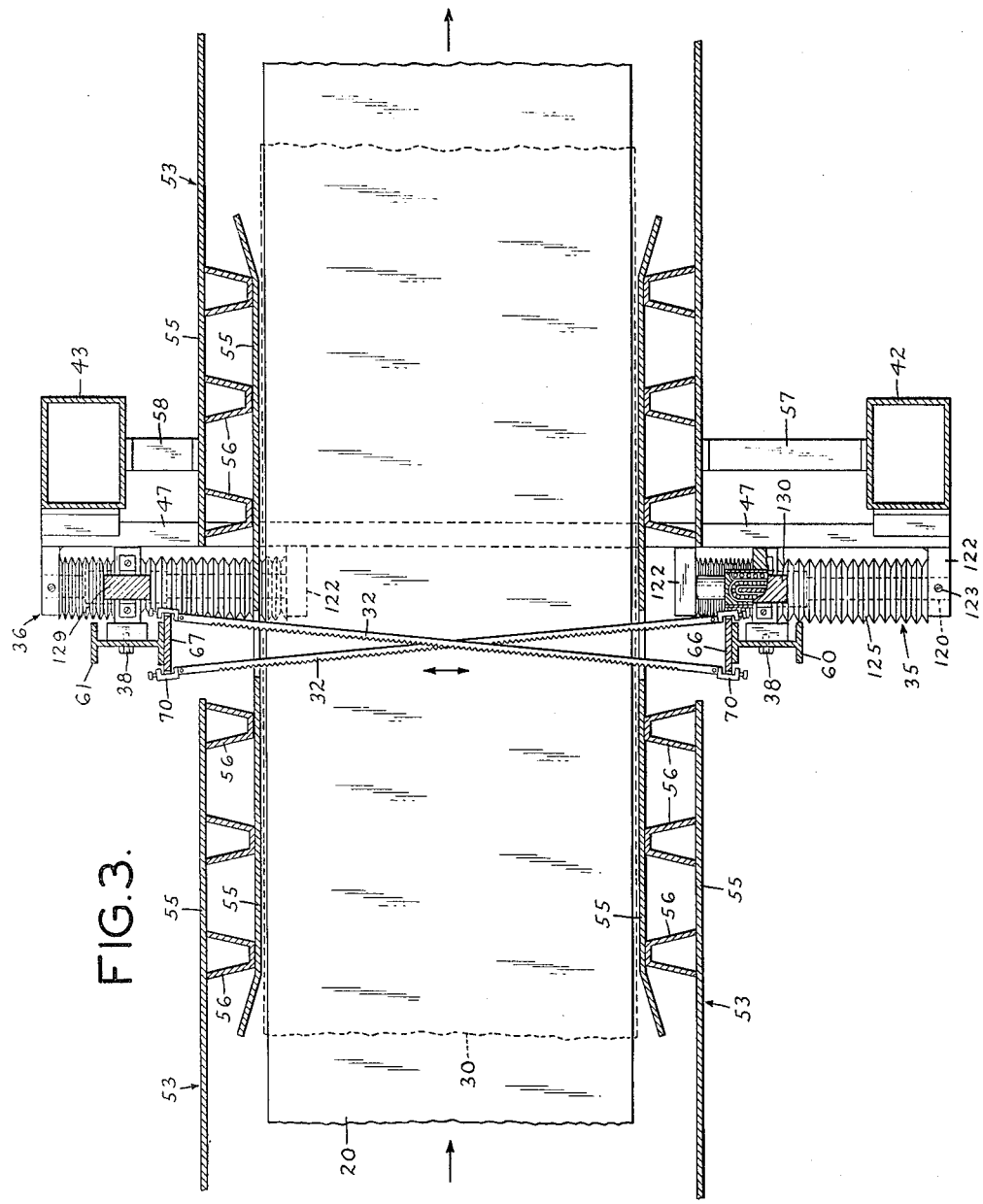

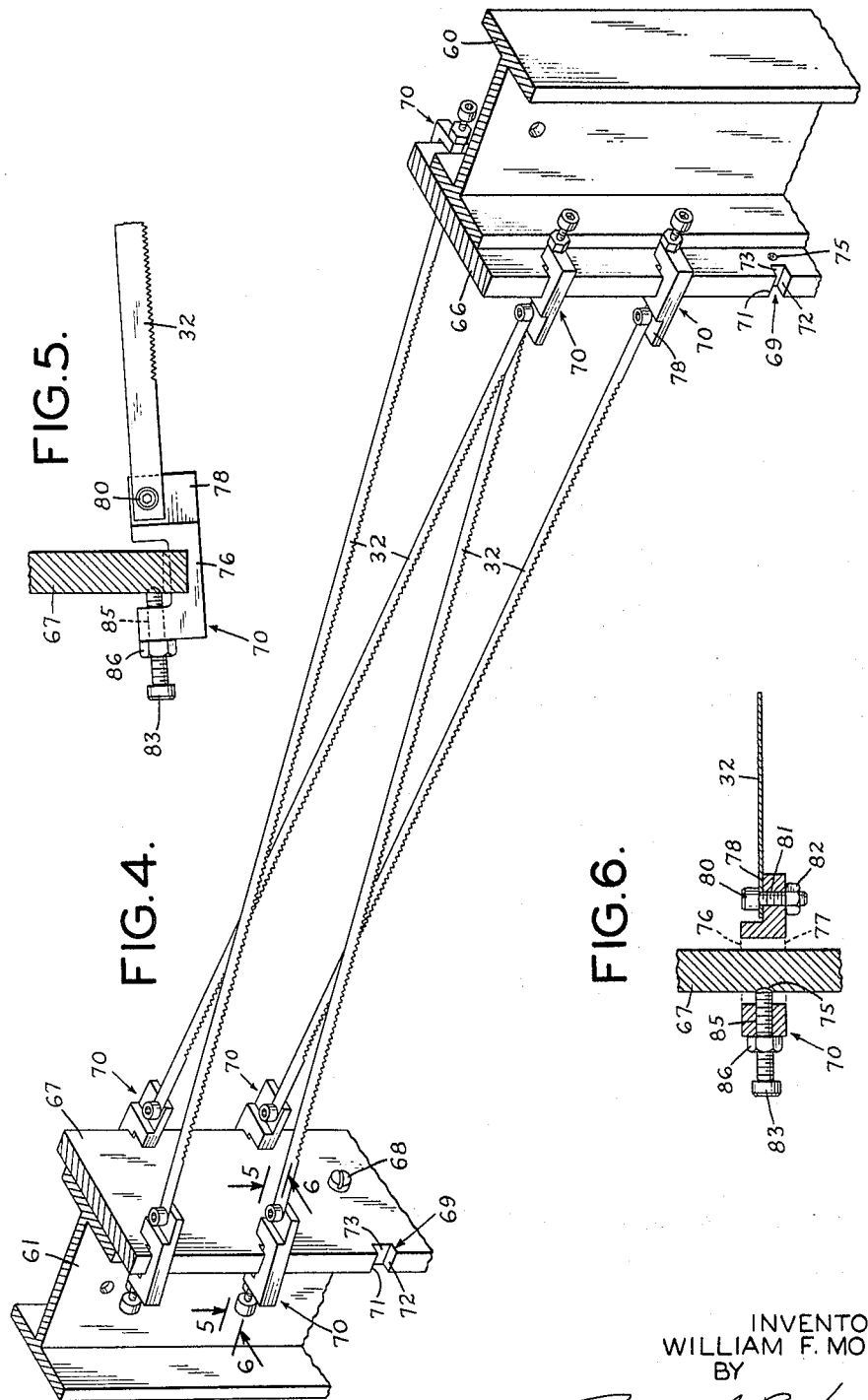

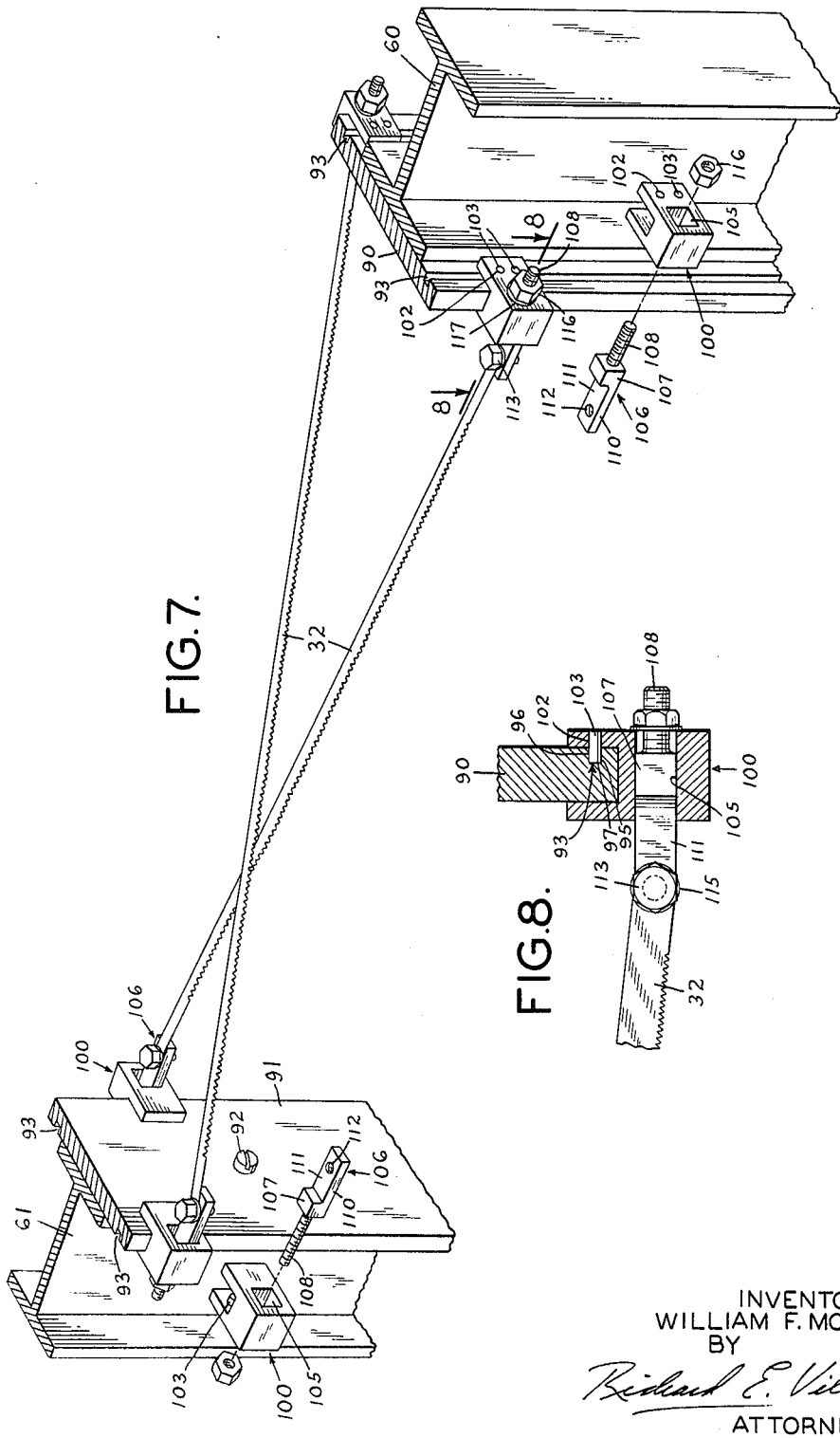

United States Patent Office
3,242,779
Patented Mar. 29, 1966

3,242,779
RECIPROCAL MULTIPLE SAW FOR CELLULAR RESINOUS BODIES
William F. Mona, Mineola, N.Y., assignor to Allied Chemical Corporation, New York, N.Y., a corporation of New York
Filed Nov. 27, 1964, Ser. No. 414,142
17 Claims. (Cl. 83—4)

This invention relates to cutting of cellular bodies, and more particularly to improved apparatus for cutting a plurality of slabs from large blocks of expanded cellular resinous materials such as polyurethane foam.

Cellular products obtained by expansion of resinous materials are of increasing importance. Slabs or boards of a number of foamed materials such as polyurethane have been in constantly increasing demand for use in a variety of applications, including particularly insulating applications in a number of areas of the construction industry. In the production of such slabs or boards it is conventional to produce a large block or bun of the cellular material and then divide the block into a number of individual slabs. One method employed in the past involves the use of electrically heated wires which are drawn through the foamed material to cause severing of the cellular material. Not only is this approach undesirably slow in operation but also limited in application as certain foams are burned or charred by the hot wire. Another method of producing slabs or boards of cellular material involves the use of blade cutting equipment. Conventional cutting apparatus similar to the well-known bandsaws have been employed but are limited in capability to the making of only a single cut in the large cellular blocks. A particularly preferred apparatus for cutting of large cellular blocks is a multiple blade machine capable of sawing or slabbing the block into a plurality of boards during a single pass through the machine. Generally, the provision of such multiple blade cutting apparatus for large cellular resinous materials is not a simple matter and involves a number of considerations and problems including maintenance and ability to readily change blades and blade settings with a minimum of down time. The influence of lateral forces caused by the blade cutting action is an important factor affecting efficient practical operation and product quality. It is also desirable to have a multiple-blade machine capable of cutting the cellular blocks into various desired thicknesses and particularly a machine capable of cutting the large cellular blocks into the thinner boards.

An object of the present invention is to provide for improved cutting of cellular blocks of resinous material into a multiplicity of slabs or boards.

Another object of the invention is to provide apparatus for cutting large blocks of cellular material simultaneously in a single pass into a multiplicity of slabs.

Another object is to provide a foam cutting apparatus capable of readily cutting cellular blocks of substantial length at high speeds into a multiplicity of slabs of required thicknesses in a single pass of the block through the apparatus.

A further object is to provide cutting apparatus for converting a cellular block into slab units of desired thickness and particularly an apparatus for efficiently and effectively cutting such blocks into the thinner slab units.

A further object is to provide a foam cutting apparatus having a multiplicity of spaced cutting blades and readily changeable with respect to blade setting to simultaneously produce slabs of most any desired thickness on a single pass of a block of cellular material through the machine.

A still further object of the invention is to provide a cutting machine of compact construction and low capital investment capable of operation at low cost and requiring little maintenance whereby blocks of cellular material may be rapidly and efficiently cut into a multiplicity of slabs during a single pass through the apparatus.

Still further objects include the provision of blade assemblies and interchangeable blade carriers permitting rapid change of blades and changeover of the apparatus to most any desired blade setting adapted to cut a multiplicity of slabs from blocks of cellular material.

Other objects and advantages will be evident from the following description of the invention and accompanying drawings, in which:

FIG. 1 is a perspective view of the cutting apparatus of the present invention.

FIG. 2 is a vertical section taken along line 2—2 of FIG. 1 showing blade assembly and supporting members.

FIG. 3 is a horizontal section taken along line 3—3 of FIG. 2 and showing a preferred construction and arrangement of cutting blades.

FIG. 4 is a fragmentary view in perspective showing detail of blade assembly and arrangement as mounted on blade support carriers.

FIG. 5 is a plan view showing in detail a preferred blade holder and its mounting as employed in the apparatus of the invention.

FIG. 6 is a vertical section taken along line 6—6 of FIG. 4 showing in detail a preferred blade holder and its mounting on a preferred blade holder carrier.

FIG. 7 is a fragmentary and partially exploded view in perspective showing detail of a preferred alternative blade supporting assembly.

FIG. 8 is a horizontal section taken along line 8—8 of FIG. 7 and showing in detail the preferred blade holding assembly employed with the alternative preferred blade support assembly of FIG. 7.

Referring to the drawings, FIG. 1 shows the improved cutting apparatus of the invention to include a conveyor belt 20 which is supported during movement on a bedplate 21. Conveyor belt 20 has a slip-resistant surface desirably of corrugated rubber and is preferably an endless belt driven between rollers 22 and 23 which are supported on a conveyor frame assembly designated generally as 24 and including a plurality of upright legs 26 and a suitable bedplate support frame (not shown). The conveyor belt is driven through roll 23 by a gear train and drive chain assembly 28 attached to a variable speed gear box 29 which is driven by a suitable motor (not shown).

Conveyor belt 20 advances a large cellular body 30 into a multiple blade cutting assembly designated generally as 31 and including a plurality of spaced parallel blades 32 and a blade-supporting main saw frame 33 which is desirably normal with respect to the path of the advancing cellular body. In operation, the multiple blade cutting assembly is reciprocated laterally with respect to the path of the cellular body on lineal bearing assemblies designated generally as 34, 35, 36 and 37. The main saw frame 33 is detachably secured to the lineal bearing assemblies by bolts 38 to permit the cutting assembly to be easily replaced by a second or reserve assembly when a change in blade setting is to be made. The lineal bearing assemblies also serve to support the multiple blade cutting assembly 31 on the main stationary supporting frame designated generally as 40 and including an overhead frame member 41, vertical supporting frames 42 and 43, base frame members 44 and 45, and bearing assembly supporting beam members 46 and 47. The main stationary supporting frame 40 is desirably rigidly secured to the floor or other supporting surface by base frame supports 48 and 49 to avoid any undesirable vibration effects. Rollers 50 are supported on arms 51 and are pivotally mounted on overhead frame member 41 so that the rollers 50 exert a moderate pressure on the advancing cellular body to assure steady movement of the body along a generally fixed path. Protrusions 52 on arms 51 maintain the rollers at a height sufficient to permit the rollers to automatically mount the advancing cellular body and also prevent the rollers from moving into the cutting assembly 31 when not in use. Guide assemblies 53 are constructed preferably of plywood sides 55 and steel supporting members 56 which are secured to the conveyor frame assembly 24. The guide assemblies have height approximately the same as the cutting assembly 31 and are suitably supported at the upper regions, as by horizontal support frames 57 and 58 (shown in FIG. 3). The guide assemblies are located on each side of the cellular material and on both the upstream and downstream sides of the cutting assembly to guide the cellular body into the assembly on the upstream side and prevent dislocation or scattering of the many relatively light weight boards discharged on the downstream side. To insure full control over the cut boards the guide assemblies on the upstream and downstream sides are preferably made substantially contiguous by a plurality of slots made in the upright plywood sides in number and size sufficient to extend the ends of the guides without interference between the blades of the multiple blades cutting assembly.

The cellular body is moved steadily along on conveyor 20 and cut into a number of slabs or boards by the plurality of saw-toothed blades 32 which are mounted under tension and in criss-cross arrangement on the laterally reciprocating multiple blade cutting assembly. The criss-cross blade arrangement is an important factor in effectively cutting a moving large cellular body into boards and particularly with a plurality of blades whose cutting action is in the same direction at any given instant. In a sense, the criss-cross blade arrangement simulates the action of a person sawing. More particularly, the criss-cross blade arrangement divides the resulting blade assembly into two distinctive cutting sections as defined by an imaginary vertical line at the center of the main saw frame 33 and through the common points where the blades are crossed. The two cutting sections which are on each side of the vertical centerline of the saw frame are essentially separate cutting sections which engage the cellular body at different times yet cooperatively cut the block into slabs or boards as required. Hence, the multiple blade cutting assembly moves laterally and one of the sections engages the cellular body in a cutting action while the other section is withdrawing from the cellular body or cut made therein during the opposite stroke of the reciprocation cycle. The criss-cross blade arrangement therefore permits substantially only a positive cutting action to be exerted on the cellular body and avoids harmful or destructive contact of the cellular resinous material with the blade teeth on the return stroke whereby good product quality and efficient operation are insured. The criss-cross arrangement also aids in offsetting lateral forces which are also a cause of inefficient operation and production of boards of inferior quality. Generally, the criss-cross arrangement is obtained by offsetting the individual blades at a slight or moderate angle with respect to the vertical plane of the main saw frame or direction of lateral reciprocation. Effective results may be obtained when the angle of offset or cant is as little as 1° although a disposition of the blades at an angle up to about 20° from the vertical plane may also be employed. Best results are generally obtained when the angle of offset is between about 2° to 10°. In cutting of rigid or semi-rigid cellular bodies of resinous material a saw-toothed blade is required for efficient operation. The apparatus of the invention is especially suited to give best results with hack saw type blades in which the leading cutting edge of the individual teeth is set above a longitudinal line at the base of the teeth by an angle of about 30° or more. It is generally preferred to employ the hack saw type blades having 5 to 25 teeth per inch with the individual teeth having the leading cutting edge above the longitudinal base line of the blade by an angle between about 40° to 85°. The number and thickness of the boards produced is determined respectively by the number of blades and spacing between adjacent blades. Generally, any desired board thickness may be obtained, usually between ¼ to 4 inches, with the apparatus being especially suited for cutting the large cellular bodies into the thinner boards having thickness less than about 1 inch. The number of blades employed ranges between about 10 to 40 although most any number may be employed depending on the size of the machine and purpose of the operation.

The main saw frame 33 may be any structure rigidly constructed to support the blades 32 and is suitably formed by opposing vertical saw frame and blade support members 60 and 61 and opposing horizontal frame members 62 and 63. Saw frame members 60, 61, 62 and 63 are rigidly joined by corner blocks 65 and are spaced from each other sufficient to form a frame opening which permits the saw frame to reciprocate laterally with only the saw blades in the path of the cellular body. The saw blades 32 may be mounted directly on suitable vertical saw frame and blade support members 60 and 61 but are preferably mounted on blade holder carriers 66 and 67 which in turn are secured to the vertical saw frame and support members 60 and 61. For this purpose, the vertical saw frame members 60 and 61 are preferably H-beams, as shown, or other suitable type members adapted to support the blade holder carriers securely on the main saw frame. The blade holder carriers 66 and 67 determine the blade setting and are detachably secured to the saw frame 33 by tap screws 68 to permit the blade holder carriers to be readily removed and replaced by other blade holder carriers having different blade settings. Change of the blade setting and blade holder carrier may be readily accomplished off the machine without excessive down time and requires only a single space main saw frame.

The blade holder carriers may take various forms but are preferably elongated rectangular plates which are wider than the immediately adjacent or abutting leg of the supporting H-means so that the length or longitudinal sides of each blade holder carrier extend a substantial distance beyond the corresponding length edge of the H-beam leg to provide space for the blade mounting. Generally, width of the blade holder carriers determine the cant or offset of the blade from the vertical plane of the saw frame and is set accordingly. In a preferred embodiment shown in FIGS. 1–4, inclusive, the blade holder carriers 66 and 67 have a plurality of spaced notches or channels 69 along both length sides which for purpose of reference may be herein designated the upstream length side and downstream length side with respect to the direction of travel of the advancing cellular body. The channels 69 are adapted to receive blade holders 70 which form a part of the blade assemblies to be mounted on the blade holder carriers. To obtain the desired criss-cross blade arrangement the channels on each length side of each blade holder carrier are staggered with respect to the channels on the other length side of the carrier with the channels on one length side of each blade holder carrier being in horizontal alignment with the channels on the opposite stream length side of the opposing blade holder carrier. As shown particularly in FIGS. 4, 5, and 6, the channels 69 extend inwardly from each length side of the blade holder carrier and through the entire thickness of the holder carrier. Channels 69 have two inner and opposing parallel surfaces 71 and 72 which are machined smooth or planar to slidably or closely fit the blade holders 70 inserted therein. The base surface 73 of each channel 69 is preferably slightly inclined in the direction of general alignment with the canted saw blades to insure proper alignment of the blade assemblies. The blade holder carriers have recesses 75 in the surface of the carrier opposite the path of the advancing cellular body. The recesses 75 are associated with the end of the channels 69 and are adapted to receive and hold a small complementary shaped member or pin carried by the blade holder. The recesses 75 may be individual conical recesses, as shown, or provided by a continuous V-shaped recess extending longitudinally along the surface of the holder carrier. The opposing parallel channel surfaces 71 and 72 together with the recesses 75 cooperate to fix the blade holders 70 securely against movement on the blade holder carriers.

As shown particularly in FIGS. 4, 5 and 6, the individual blade holders 70 are preferably C-shaped and have upper and lower surfaces 76 and 77 which are machined smooth to slidably fit the channels 69. The blade holder has an additional planar surface 78 stepped down from the upper surface 76. The end of the saw blades are securely held on the surfaces 78 by small bolts 80 which are fitted into correspondingly threaded tap holes 81 in the blade holder and are secured by nuts 82. The tensioning screw 83 fits a corresponding size threaded tap hole 85 in the end of blade holder opposite the blade supporting surface 78. The end of the tensioning screw is adapted to be held in the recesses 75 of the blade holder carrier and construction of the blade holder itself is desirably such that the longitudinal centerline of the tensioning screw 83 intersects the centerline of the tap hole 81 and also preferably lies in the same horizontal plane as the saw blade 32 to insure optimum alignment of the tensioned blade on the blade holder carriers. The tensioning screw 83 is fitted with a correspondingly threaded nut 86 which together with the tensioning screw enable the blades to be readily mounted, adjusted and locked under the desired tension.

In FIGS. 7 and 8 there is shown an alternate preferred embodiment of the blade holder carriers and blade mountings thereon especially adapted to provide a multiple blade cutting assembly on which a number of different blade spacings may be readily obtained without change or removal of the blade holder carriers. In this embodiment the blade holders 90 and 91 are also preferably elongated rectangular plate members detachably secured by suitable bolts 92 to the vertical saw frame and blade support members 60 and 61 of the main saw frame 33. The relative width and positioning blade holder carriers 90 and 91 with respect to the opposing vertical members 60 and 61 is similar to that of the blade holder carriers 66 and 67 as hereinbefore described. Each of the blade holder carriers 90 and 91 have two parallel grooves or channels 93 extending longitudinally in the surface of the carriers opposite the path of the advancing cellular body and located respectively near the upstream and downstream length side edges of the holder carriers. The channels 93 preferably have opposing parallel and planar side surfaces 95 and 96. In this embodiment the blade assemblies are held on the blade holder carriers 90 and 91 by a plurality of blade mounting blocks 100 which are adapted to be readily adjustable with respect to their position along the length sides of the holder carriers to permit change of blade spacing without change of the holder carriers. As shown, the blade mounting blocks may be held in their desired lateral position by the forces exerted by the tensioning of the blades. When so held the mounting blocks 100 are equipped with means to restrain the blocks from twisting in their established position. For this purpose, the mounting blocks have preferably two threaded tap holes 102 extending through the blocks and adapted to receive correspondingly threaded retaining pins 103 having terminal portions which fit the width of the channels 93. The blade mounting blocks 100 are adapted to receive and securely retain a blade holder which forms a part of the blade assemblies to be mounted thereon. As shown, the preferred blade mounting blocks are generally C-shaped and have an opening 105 extending through the body of the block. The opening 105 preferably has a centerline normal to the longitudinal centerline of the blade holder carrier on which it is secured and parallel to the vertical plane of the main saw frame. The opening 105 is preferably a square broached hole adapted to receive and retain a blade holder 106 against any tendency to twist or otherwise cause dislocation of the blade assemblies. As shown, the blade holders 106 are preferably integral bodies having a squared shaped body portion 107 adapted to slidably fit the opening 105. From one end of the square body portion 107 there is a threaded extension 108 while the opposite end forms a blade holding platform 110 having a planar blade supporting surface 111 and a threaded tap hole 112. Cap screws 113 fit the threaded holes 112 and secure the saw blades 32 on the blade holders with the aid of lock washers 115. The blade assemblies including saw blades 32 and blade holders 106 are easily secured on the blade mounting blocks 100 by a tensioning nut 116 and lock washer 117 which are adapted to fit the threaded extension 108 of the blade holders 106.

Referring again to the preferred embodiment of the invention shown particularly in FIGS. 1, 2 and 3, the multiple blade cutting assembly 31 is reciprocated laterally on the lineal bearing assemblies 34, 35, 36 and 37 which include a bearing bushing or bearing pillow block 120 having a substantial solid and preferably block-like body portion with a threaded opening (not shown) to receive the bolts 38 which detachably secure the main saw frame 33 to the lineal bearing assemblies. The bearing pillow blocks 120 are conventional, commercially available units such as those obtainable under the designation Ball Bushings, series A, part No. A–406080 from Thompson Industries, Inc. Such suitable bearing pillow blocks 120 also have an elongated cylindrical portion adapted to receive and retain the ball bearings preferably in separate continuous bearing races or channels which each have elongated channel portions parallel to the bearing shaft 121, substantially as illustrated by the cut-away section shown in FIG. 3. The bearing pillow blocks 120 ride on the bearing shafts 121 between two bearing shaft support blocks 122 which are spaced sufficiently apart to allow for any desired lateral movement or cutting stroke by the blade cutting assembly 31. The bearing shafts 121 are securely held on the shaft support blocks 122 by threaded pins 123. The shaft support blocks 122 are rigidly secured by suitable means (not shown) to the bearing assembly supporting beam members 46 and 47. The bearing shafts and working parts of the lineal bearing assemblies are desirably protected from sawdust and other foreign matter by bellows 125 which are preferably of rubber or other suitable material capable of expansion and compression. Each bearing assembly is equipped with two such bellows connected respectively at one end near or at each bearing shaft support block 122 and at the other end over the closest end of the cylindrical portion of the bearing pillow block 120.

The multiple blade assembly 31 is connected to suitable means for driving the assembly in short stroke lateral reciprocation on the lineal-bearing assemblies 32, 33, 34 and 35. As shown particularly in FIGS. 1, 2 and 3, the bearing assemblies on each side of the path of movement are preferably vertically aligned and joined together by vertical members 129 and 130 which are secured at their ends by suitable means such as angles to the bearing pillow blocks. A connecting rod 131 is attached at one end to the vertical member 130 by pivot pin block 132 and flanges 133. The other end of the connecting rod 131 is attached to an eccentric or adjustable throw crank disc 135 which rotates on one end of the drive shaft 136 to effect reciprocation of the multiple blade cutting assembly. The drive shaft 136 is held by pillow bearing blocks 137 which are secured on a support block 138 which in turn is secured to the main stationary supporting frame 40. The shaft 136 is rotated by a gear train and drive chain assembly 140 which in turn is connected on a common shaft 141 to drive belts and pulleys assembly 142. Pillow bearing blocks 143 hold the shaft 141 on the support block 138. The drive belts and pulleys assembly 142 is driven by a variable speed motor 145 which is securely held on the main stationary frame 40 by the support platform 146.

The cutting apparatus of the present invention provides an efficient and rapid method of dividing large cellular bodies of resinous materials into a plurality of slabs or boards. In operation, the cellular body is steadily advanced on the conveyor 20 at a speed adjusted to the cutting capacity of the multiple blade cutting assembly 31.

Generally, the cutting capacity of the blade cutting assembly is dependent largely on the particular cellular material being cut, size of the cellular bodies, number and type of saw blades and of course the speed or number of reciprocation per minute of the cutting assembly. Operating speeds are typically of a high order within the range of about 100 to 1,000 strokes per minute equivalent to about 50 to 500 reciprocations per minute, the apparatus of the invention being very effective at the lower range speed between about 100 to 500 strokes per minute equivalent to 50 to 250 reciprocations per minute. The length of a single stroke as measured by the lateral travel of the multiple blade cutting assembly may be typically between about 2 to 15 inches, more usually 6 to 10 inches, depending on the desired cutting rate and type of product being produced. The speed or rate of advancement of the cellular body is set at a rate sufficient to continuously maintain at least some portion of the cellular body in contact with the blades but of course below a rate which unduly force the cellular body into the blades. Preferably, the speed of the advancing body is such that the blades on one side of the blade assembly come into sawing contact with the cellular body after the multiple blade cutting assembly has travelled between about 0 to 40%, more preferably 5% to 30%, of its lateral stroke distance.

The cutting apparatus is particularly adapted for the cutting of rigid or semi-rigid type cellular resinous materials. Flexible or soft bodies of resinous cellular materials may be sliced using the apparatus by employing scalloped or serrated edge blades. Typical examples of such cellular resinous materials include foams of polyurethane, polystyrene, polyvinyl chloride, polyethylene and synthetic and natural rubbers. A number of such cellular materials prepared particularly by open mold expansion have characteristic cell structures which produce slabs of widely varying cell structure and properties depending upon the direction of cutting into the cellular block. Slabs of such widely varying characteristics may be produced on the apparatus of the present invention by positioning the cellular block on the conveyor belt in the desired position in relation to the direction of expansion of the block as required to produce the slabs of the desired properties. In situations where the cellular blocks have substantial width compared to thickness and positioning on the relatively narrow ends may be inconvenient, the apparatus of the present invention as described and shown on the drawings may be constructed in a position equivalent to a rotation of 90° of the cutting assembly with the blades set in parallel vertical spaced relationship path of movement on the conveyor belt to permit the desired cutting of the cellular body.

Although certain preferred embodiments of the invention have been disclosed for purpose of illustration, it will be evident that various changes and modifications may be made therein without departing from the scope and spirit of the invention.

I claim:

1. Apparatus for cutting a body of expanded cellular resinous material comprising, in combination, means for advancing the cellular body steadily along a generally fixed path, stationary supporting means in spaced relation to the path of the cellular body, a rigid saw frame spaced from and surrounding the path of said body and slidably supported on said stationary supporting means for reciprocation laterally with respect to the path of movement of the cellular body, a plurality of spaced parallel thin blades supported by said saw frame in criss-cross arrangement in the path of the cellular body, and means for driving said saw frame in lateral short stroke reciprocation to cut a plurality of slabs from the cellular body as the body moves into said blades.

2. The apparatus of claim 1 in which the individual blades in the criss-cross blade arrangement are offset from the plane of lateral reciprocation of the saw frame by an angle between about 2° to 10°.

3. Apparatus for cutting a body of expanded cellular resinous material comprising, in combination, means for advancing the cellular body steadily along a generally fixed path, stationary supporting means in spaced relation to the path of the cellular body, a rigid saw frame spaced from and surrounding the path of sad body and slidably supported on said stationary supporting means for reciprocation laterally with respect to the path of movement of the cellular body, said saw frame including a pair of saw frame and blade support members in generally parallel and coplanar relation on opposing sides of the path of said cellular body, a plurality of spaced parallel thin-toothed blades supported by said pair of saw frame and blade support members in criss-cross arrangement in the path of the cellular body, and means for driving said saw frame in lateral short stroke reciprocation to cut a plurality of slabs from the cellular body as the body moves into said blades.

4. Apparatus for cutting a body of expanded cellular resinous material comprising, in combination, means for advancing the cellular body steadily along a generally fixed path, stationary supporting means in spaced relation to the path of the cellular body, a rigid saw frame spaced from and surrounding the path of said body and slidably supported on said stationary supporting means for reciprocation laterally with respect to the path of movement of the cellular body, said saw frame including a pair of saw frame and blade support members in generally parallel and coplanar relation on opposing sides of the path of said cellular body, a pair of blade holder carriers in parallel relation and secured respectively to said pair of saw frame and blade support members, a plurality of spaced parallel thin-toothed blades in criss-cross arrangement in the path of the cellular body, blade holders secured to each end of said blades and mounted on said blade holder carriers, and means for driving said saw frame in lateral short stroke reciprocation to cut a plurality of slabs from the cellular body as the body moves into said blades.

5. Apparatus for cutting a body of expanded cellular resinous material comprising, in combination, means for advancing the cellular body steadily along a generally fixed path, stationary supporting means in spaced relation to the path of the cellular body, a rigid saw frame spaced from and surrounding the path of said body and slidably supported on said stationary supporting means for reciprocation laterally with respect to the path of movement of the cellular body, said saw frame including a pair of saw frame and blade support members in generally parallel and coplanar relation on opposing sides of the path of said cellular body, a pair of blade holder carriers in parallel relation and detachably secured respectively to said pair of saw frame and blade support members, said blade support carriers being elongated members of substantial width and presenting upstream and downstream length sides with reference to the path of movement of the cellular body, a plurality of spaced channels along each length side of each of the blade holder carriers, the channels on a length side of each blade holder carrier being staggered with respect to the channels on the other side of the blade holder carrier with the channels on one length side of each blade holder carrier being in alignment with channels on the opposite stream side of the other blade holder carrier to form a plurality of channel pairs on opposing side of the path of the cellular body offset with respect to the plane of lateral reciprocation of the saw frame, a plurality of thin-toothed blade in the path of said body, blade holders secured to the ends of said blades to form a plurality of blade assemblies, the blade holders of said blade assemblies being secured in said channel pairs and mounted on said blade holder carriers in blade-tensioning relation, and means for driving said saw frame in lateral short stroke reciprocation to cut a plurality of slabs from the cellular body as the body moves into said blades.

6. Apparatus for cutting a body of expanded cellular resinous material comprising, in combination, means for advancing the cellular body steadily along a generally fixed path, stationary supporting means in spaced relation to the path of the cellular body, a rigid saw frame spaced from and surrounding the path of said body and slidably supported on said stationary supporting means for reciprocation laterally with respect to the path of movement of the cellular body, said saw frame including a pair of saw frame and blade support members in generally parallel and coplanar relation on opposing sides of the path of said cellular body, a pair of blade holder carriers in parallel relation and detachably secured respectively to said pair of saw frame and blade support members, said blade support carriers being elongated members of substantial width and presenting upstream and downstream length sides with reference to the path of movement of the cellular body, a plurality of spaced channels having opposing parallel planar surfaces generally parallel to the direction of lateral reciprocation of the saw frame and positioned along each length side of each of the blade holder carriers, the channels on a length side of each blade holder carrier being staggered with respect to the channels on the other side of the blade holder carrier with the channels on one length side of each blade holder carrier being in alignment with channels on the opposite stream side of the other blade holder carrier to form a plurality of channel pairs on opposing side of the path of the cellular body offset with respect to the plane of lateral reciprocation of the saw frame, a plurality of thin-toothed blade in the path of said body, blade holders having two opposing parallel surfaces slidably fitted between the opposing parallel planar surfaces of the channels and secured to the ends of said blades to form a plurality of blade assemblies, means associated with said channels and blade holders to secure said blade assemblies in said channel pairs mountedly on said blade holder carriers in blade-tensioning relation, and means for driving said saw frame in lateral short stroke reciprocation to cut a plurality of slabs from the cellular body as the body moves into said blades.

7. The apparatus of claim 6 in which the blade holders are equipped with a blade tensioning screw having its terminal portion fitting a recess in the surface of the blade holder carriers opposite the path of movement and associated with the end of the channels whereby the blade holders are secured in said channels mounted on said blade holder carriers.

8. The apparatus of claim 6 in which guide members are associated with the path of the cellular block on both the upstream and downstream sides of the saw frame to guide the cellular body into the blades on the upstream side and maintain the cut cellular body along a generally fixed path on the downstream side of said saw frame.

9. The apparatus of claim 6 in which the individual blades in the resulting criss-cross blade arrangement are offset from the plane of lateral reciprocation of the saw frame by an angle between about 2° to 10°.

10. The apparatus of claim 6 in which the saw frame is slidably supported on the stationary supporting means by lineal bearing assemblies.

11. Apparatus for cutting a body of expanded cellular resinous material comprising, in combination, means for advancing the cellular body steadily along a generally fixed path, stationary supporting means in spaced relation to the path of the cellular body, a rigid saw frame spaced from and surrounding the path of said body and slidably supported on said stationary supporting means for reciprocation laterally with respect to the path of movement of the cellular body, said saw frame including a pair of saw frame and blade support members in generally parallel and coplanar relation on opposing sides of the path of said cellular body, a pair of blade holder carriers in parallel relation and detachably secured respectively to said pair of saw frame and blade support members, said blade support carriers being elongated members of substantial width and presenting upstream and downstream length sides with reference to the path of movement of the cellular body, a plurality of blade mounting blocks adjustably securable along both length sides of blade holder carriers, means for securing said blade mounting blocks on said blade holder carriers, a plurality of spaced parallel thin-toothed blades in criss-cross arrangement in the path of the cellular body, blade holders secured to each end of said blades and held by said blade mounting blocks in blade tensioning relation, and means for driving said saw frame in lateral short stroke reciprocation to cut a plurality of slabs from the cellular body as the body moves into said blades.

12. Apparatus of claim 11 in which the blade holder carriers have elongated channels in the surface opposite the path of movement of the body and associated with the length sides thereof and in which the blade mounting blocks are equipped with means fitting said channels cooperatively to restrain the mounting blocks against twisting on said blade holder carriers, said blade mounting blocks being held in position on said blade holder carriers by the blade tensioning forces exerted upon said mounting blocks.

13. The apparatus of claim 11 in which the individual blades in the criss-cross blade arrangement are offset from the plane of lateral reciprocation of the saw frame by an angle between about 2° to 10°.

14. The apparatus of claim 11 in which the saw frame is slidably supported on the stationary supporting means by lineal bearing assemblies.

15. A readily detachable and mountable multiple blade cutting assembly for a multiple blade cutting machine especially suited for cellular resinous materials and including means for advancing a large cellular resinous body steadily along a fixed path and stationary supporting means adapted to slidably support the multiple blade cutting assembly for reciprocation laterally with respect to the path of movement; said multiple blade cutting assembly comprising a rigid saw frame having a frame opening adapted to surround the path of cellular body, said saw frame including a pair of saw frame and blade support members in generally parallel and coplanar relation on opposite sides of the saw frame, a pair of blade holder carriers in parallel relation and secured respectively to said pair of saw frame and blade support members, a plurality of spaced parallel thin-toothed blades in criss-cross arrangement, and blade holders secured to each end of said blades and mounted on said blade holder carriers.

16. A readily detachable and mountable multiple blade cutting assembly for a multiple blade cutting machine especially suited for cellular resinous materials and including means for advancing a large cellular resinous body steadily along a fixed path and stationary supporting means adapted to slidably support the multiple blade cutting assembly for reciprocation laterally with respect to the path of movement; said multiple blade cutting assembly comprising a rigid saw frame having a frame opening adapted to surround the path of cellular body, said saw frame including a pair of saw frame and blade support members in generally parallel and coplanar relation on opposite sides of the saw frame, a pair of blade holder carriers in parallel relation and detachably secured respectively to said pair of saw frame and blade support members, said blade support carriers being elongated members of substantial width and presenting upstream and downstream length sides with reference to the path of movement of the cellular body, a plurality of spaced channels having opposing parallel planar surfaces generally parallel to the direction of lateral reciprocation of the saw frame and positioned along each length side of each of the blade holder carriers, the channels on a length side of each blade holder carrier being staggered with respect to the channels on the other side of the blade holder carrier with the channels on one length side of each blade holder carrier being in alignment with channels on the opposite stream side of the other blade holder carrier to form a plurality of channel pairs on opposing side of the path of the cellular body offset with respect to the plane of lateral reciprocation of the saw frame, a plurality of thin-toothed blades, blade holders having two opposing parallel surfaces slidably fitted between the opposing parallel planar surfaces of the channels and secured to the ends of said blades to form a plurality of blade assemblies, and means associated with said channels and blade holders to secure said blade assemblies in said channel pairs mountedly on said blade holder carriers in blade-tensioning relation.

17. The apparatus of claim 16 in which the individual blades in the resulting criss-cross blade arrangement are offset from the plane of lateral reciprocation of the saw frame by an angle between about 2° to 10°.

No references cited.

WILLIAM W. DYER, JR., *Primary Examiner.*

J. M. MEISTER, *Assistant Examiner.*